Jan. 20, 1970          S. F. ROE, JR          3,491,170
PRODUCTION OF MOLDED CONTAINERS
Filed Sept. 14, 1964          6 Sheets-Sheet 1
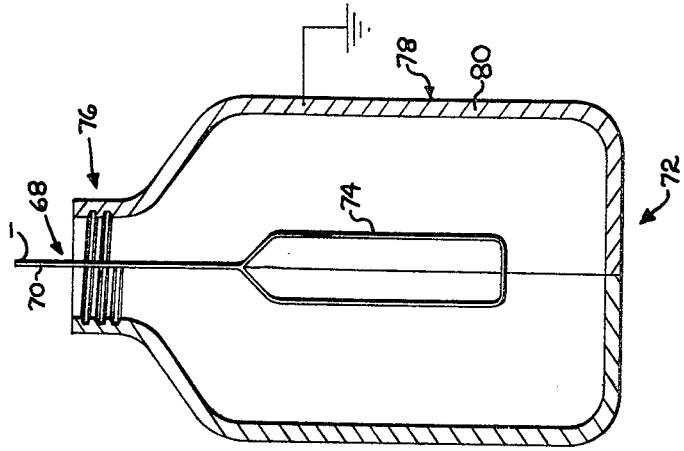
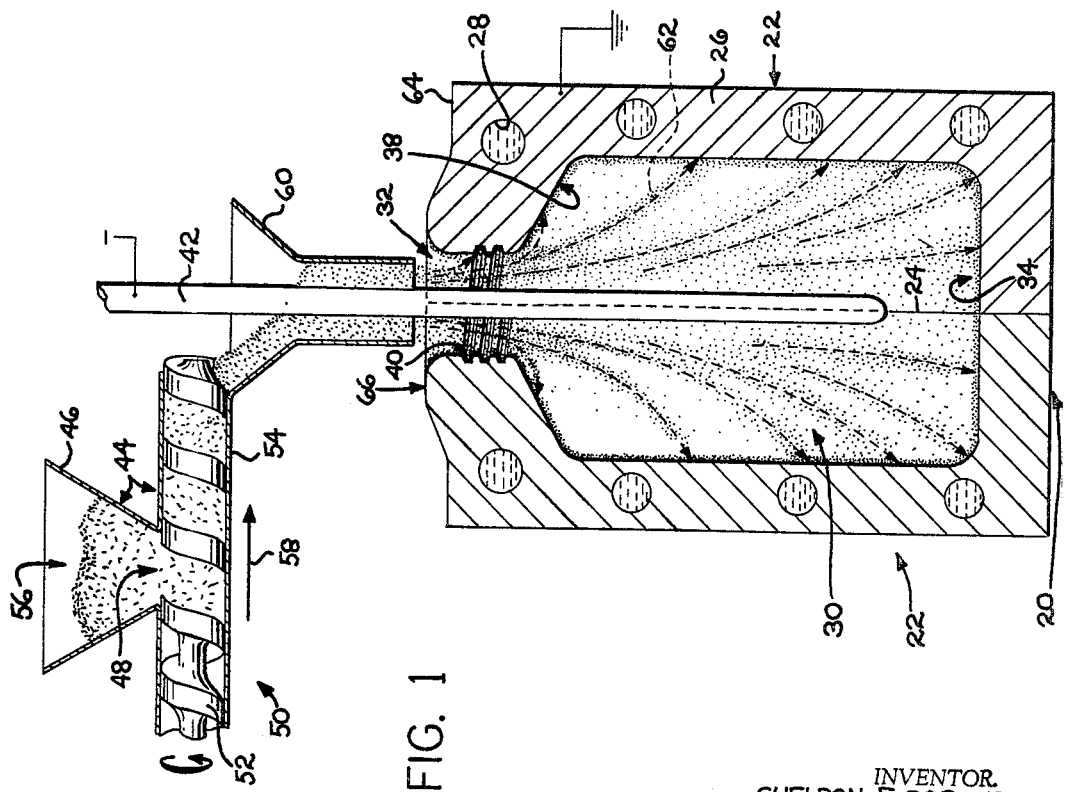
INVENTOR.
SHELDON F. ROE, JR.
BY *A. A. Schaich*
*and*
*Leslie H. Blair*
ATTORNEYS

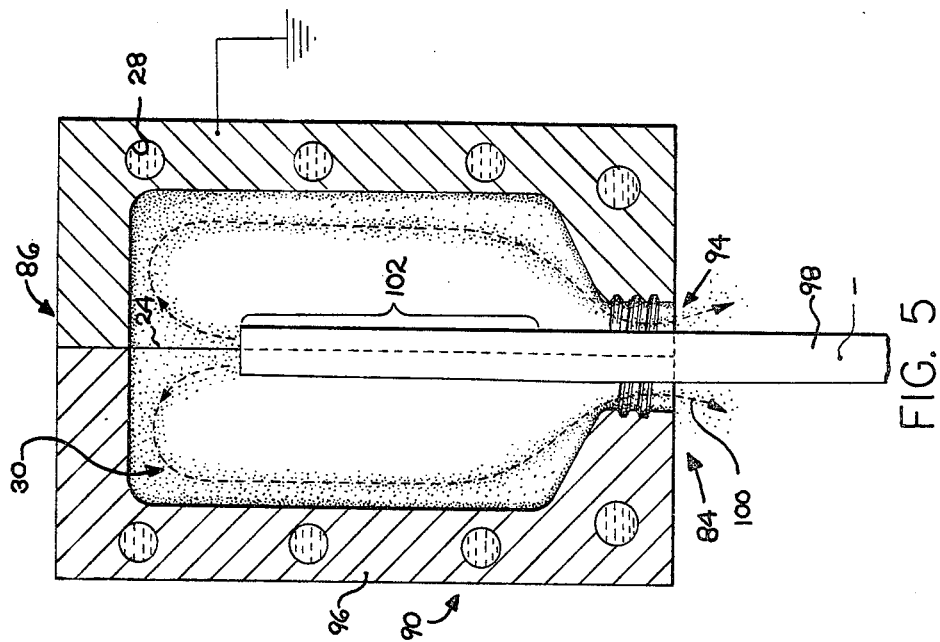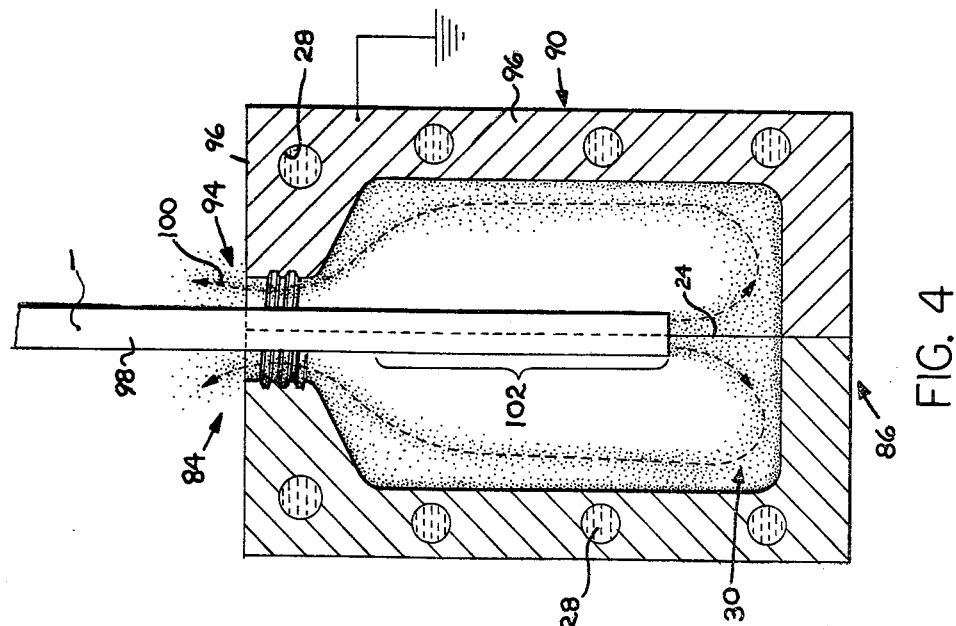

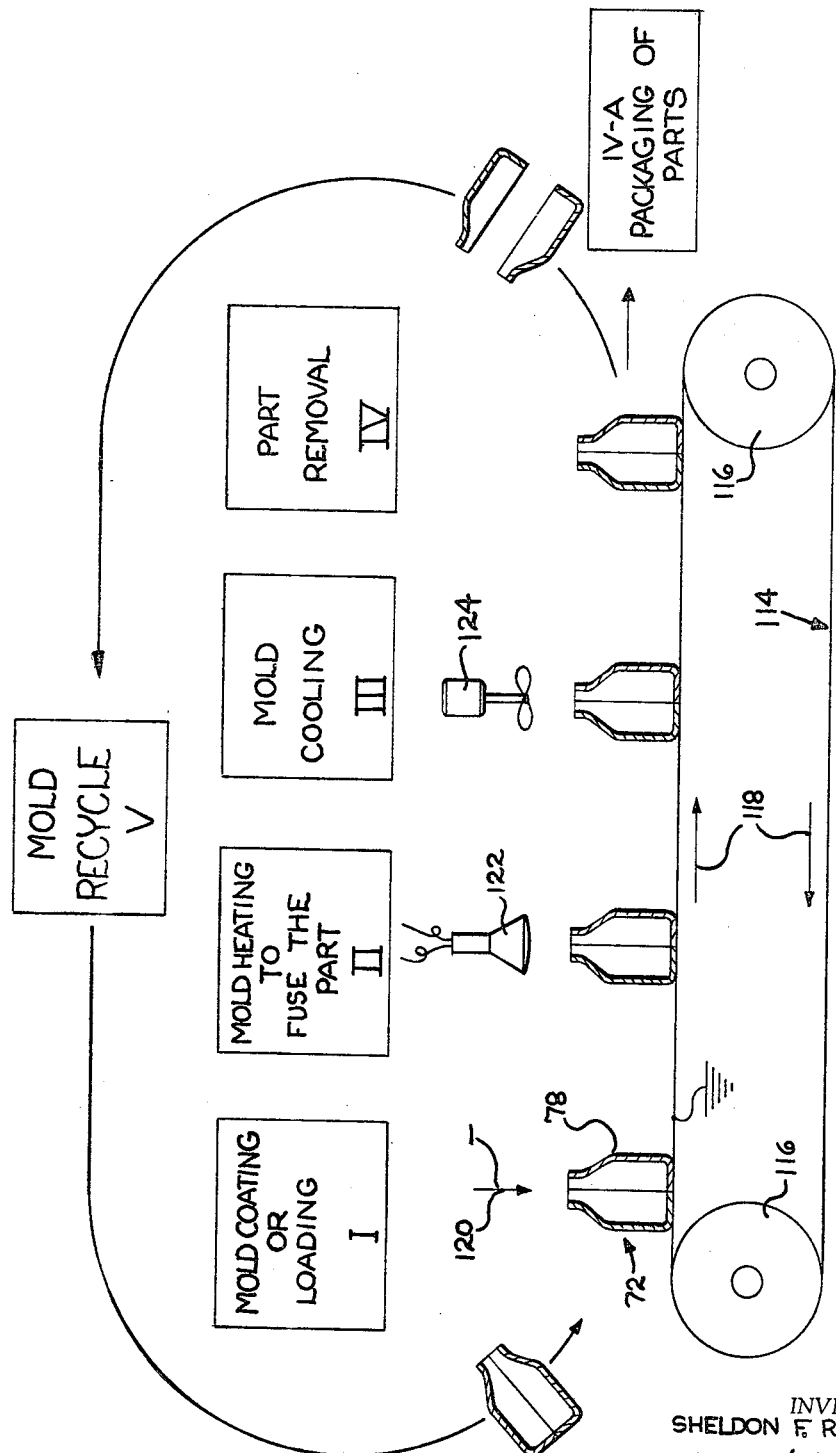

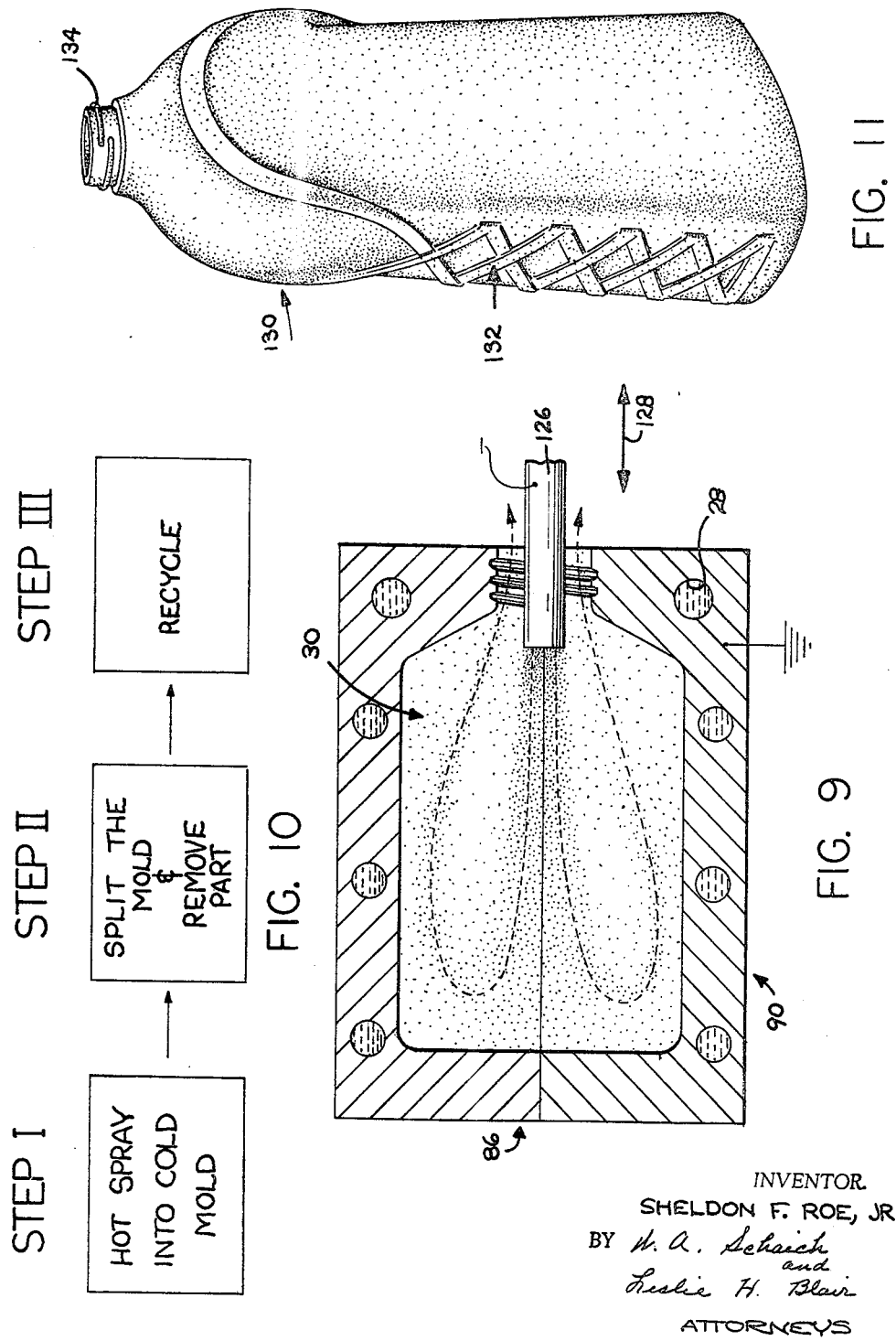

United States Patent Office 3,491,170
Patented Jan. 20, 1970

3,491,170
PRODUCTION OF MOLDED CONTAINERS
Sheldon F. Roe, Jr., Toledo, Ohio, assignor to Owens-Illinois, Inc., a corporation of Ohio
Filed Sept. 14, 1964, Ser. No. 396,004
Int. Cl. B29c *11/00, 1/00;* B29d *31/00*
U.S. Cl. 264—24                                    6 Claims

ABSTRACT OF THE DISCLOSURE

Method and apparatus are provided for producing molded plastic articles by means of the electrostatic deposition of particulate materials. An elongated cathode having a restricted portion is inserted within the cavity of a mold so that such restricted portion is aligned with the neck-defining portion of such mold. Means are provided for feeding heat-softenable particulate material through the opening with the particles becoming negatively charged and attracted to the surfaces of the mold cavity.

---

This invention relates to the production of containers from thermoplastic materials, and more particularly to methods and apparatus for producing containers such as bottles and the like from thermoplastic materials such as polyethylene, wherein the products are characterized by improved uniformity of wall thickness, and wherein production efficiencies are high.

THE PRIOR ART

Heretofore, plastic containers such as bottles and the like have been produced essentially by one method, namely blow-molding. Injection molding is ruled out for the reason that male and female molds are required. It would not be possible to remove a male mold from the part because this would require withdrawal through the neck or finish, which is too small for the body portion of a male mold. Therefore, production has been limited to blow-molding wherein split female molds only are utilized, to permit ejection of the part.

In the blow-molding process, a parison in the form of a tube with a finish, or mouth and neck, at one end, is first made. The finish suitably has an external thread to receive a screw-on cap. In the blow-molding process, production is accomplished by injection molding the finish, and then extruding a required length of tubing integral with the finish by simultaneously extruding the tube and drawing the injection molding head away from the extrusion orifice. As a pair of female mold halves close on the parison, the tubing is pressed together at a point spaced from the finish. This forms the bottom end of the ultimately formed container. Thereafter, the parison is blown up by injecting an inflating gas through the finish. This causes the parison to conform exactly to the inside of the mold cavity.

One of the problems encountered in blow-molding operations has been non-uniformity of wall thickness of the finished products. The wall of the parison is forced to stretch more in some areas than in others. This produces thin places that form weak spots in the container wall.

In short, blow-molding builds a bottle from a piece of a higher order of thickness by reducing the piece to a lower order of thickness.

In more recent disclosures of the art, it has been proposed that the manufacture of hollow plastic articles be performed by depositing either powdered or flaked plastics in rotatable molds. As the molds are rotated, the particles are theoretically thrown to the forming surface as a layer of uniform thickness. Heat is then applied to fuse the layer into a wall of uniform thickness, with the mold still spinning. After cooling to harden the part, the spinning is stopped, the molds are split, and the part removed.

In this process, the spinning molds are complex and expensive, and the production rate is low as a result of the necessary spinning, cooling, stopping, and mold splitting. Cycling is unduly long.

In favor of this process, of course, is the apparent improved uniformity of wall thickness in the articles produced. However, the other factors of high cost and low production rate mitigate against the commercial feasibility of the spinning mold or centrifugal forming technique.

Accordingly, a substantial advancement would be provided to the art by a method and apparatus for producing plastic containers wherein the containers are characterized by improved uniformity of wall thickness, and wherein not only the articles produced, but also the apparatus and method are characterized by improved economy, and wherein the production rate in terms of numbers of finished articles produced per unit time is very favorable.

Accordingly, it is an important object to provide a novel electrostatic process for loading a mold cavity to produce molded parts, wherein the electrostatic field is contoured to match the shape of the mold cavity whereby plastic articles can be formed to finished condition.

A further object is to provide a novel shell molding operation for producing plastic articles wherein electrostatic mold loading is employed.

A further object is to provide an electrostatic molding operation encompassing the principle of placing a specific mass of particulate, heat-softenable material into a mold to produce an article to finished dimensions.

A further object is to provide process and apparatus wherein heat-softened particles are electrostatically deposited in a cool mold for rapid production.

Other objects of the invention will appear in the following description and appended claims, reference being had to the accompanying drawings forming a part of the specification wherein like reference characters designate corresponding parts in the several views.

FIGURE 1 is a semi-schematic elevational view, mostly in section, of a first embodiment of apparatus for practicing the invention;

FIGURE 2 is a longitudinal sectional view of a second embodiment of apparatus for practicing the invention, wherein the cathode is specifically shaped to produce a tailor-made electrostatic field within the mold, and wherein the mold is of the shell type;

FIGURE 4 is a longitudinal sectional view of a fourth embodiment of apparatus for practicing the invention, illustrating the manner in which a gas can be utilized as a carrier to distribute particles uniformly within the mold cavity;

FIGURE 5 is an inversion of FIGURE 4;

FIGURE 8 is a schematic view illustrating another method of invention, and including a block-type flow diagram, based on the use of shell molds;

FIGURE 9 is a longitudinal sectional view of a sixth embodiment of apparatus for practicing the invention, with heat softened plastic particles;

FIGURE 10 illustrates a heat softened particle forming method of invention, as distinguished from the prior figures of the drawings that relate to the use of hard, particulate, but heat-softenable materials; and FIGURE 11 is a perspective view of a container of the type made by the present invention.

Figure 3:
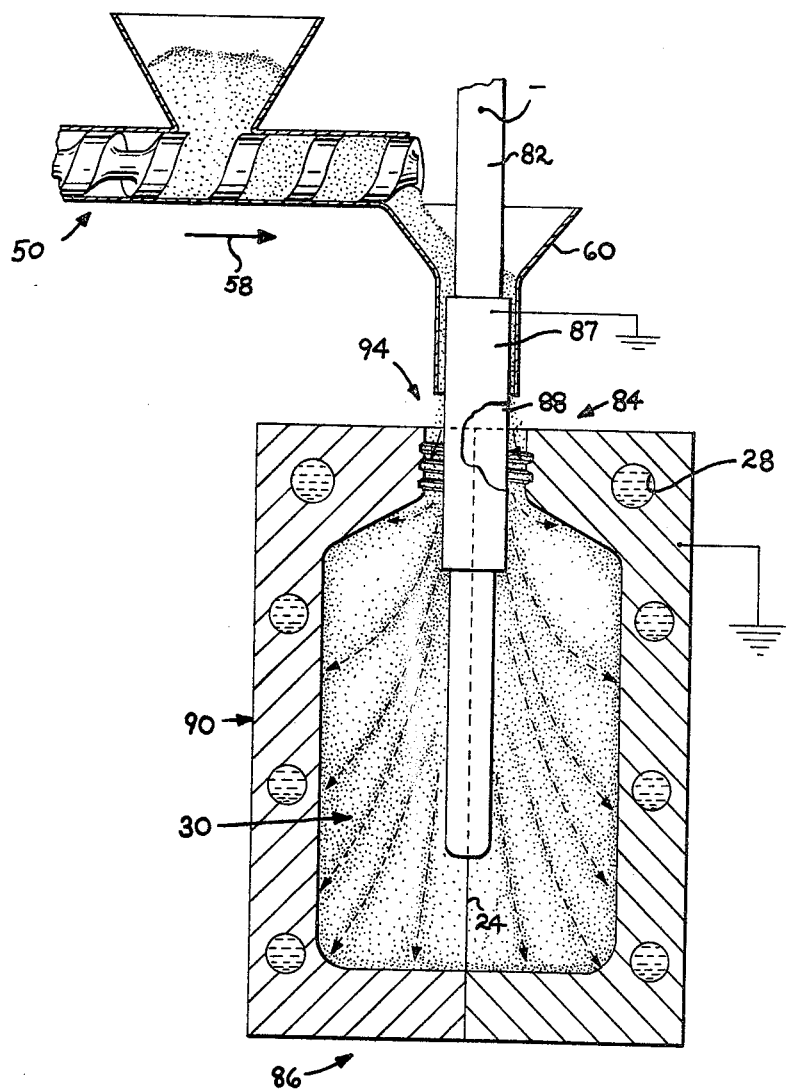
FIGURE 3 is a semi-schematic, sectional view of a third embodiment of apparatus for practicing the invention, wherein the cathode is partially shielded to produce a tailor-made electrostatic field within the mold.

It is to be understood that the invention is not limited in its application to the details of construction and arrangement of parts illustrated in the accompanying drawings, since the invention is capable of other embodiments and of being practiced and carried out in various ways. Also, it is to be understood that the phraseology or terminology employed herein is for the purpose of description and not of limitation.

BRIEF PRELIMINARY VIEW OF THE INVENTION

In accordance with the present invention, a thermoplastic material in particulate form is directed by means of an electrostatic force into adhering, coating contact with a female mold surface. In this disclosure, the terminology "particulate form," is to be understood as encompassing thermoplastic materials in either hard or heat-softened condition. In both instances, the material will be attracted to the mold surface so as to form a coating thereon of highly uniform thickness. In the case of dry particulate materials, the mold is subsequently heated in order to fuse the particles together into a unitary part. In the case of softened particles, the part will be formed automatically as the material builds up within the mold cavity by deposition on the cooler mold surface.

It is unique to the present invention that the mold surface takes the form of a container and, being so configured, is closed except for the narrow finish. Thus, unique features are provided in accordance with the present invention for moving the particulate materials by electrostatic force means through the finish and uniformly over the interior walls of the female mold.

It is known in the prior art to coat parts of various types utilizing electrostatic force means to attract a coating material. In the past, however, there has been a distinction from the present invention by the fact that the coating has remained in place on a piece or part as a protective covering. In this invention, a releasable part is made and subsequently removed from the mold after being formed therein. In the prior art, coatings such as paints, ceramic glazing powders, and the like have been applied.

More specifically, according to the prior art, bathtubs have been coated by dropping a glazing powder through an electrostatic field to charge the particles, and thus cause the charged particles to be attracted to the tub, which is positioned in the path of the falling powder. The tub is grounded to provide attraction. After the tub is properly coated, it is passed through a glazing furnace or oven where the glaze powder is fired into a vitreous coating.

Also, there is a disclosure in U.S. Patent No. 2,663,652 that a one gallon pail can be coated with a polyethylene film. The pail is grounded and a —30,000 volt potential is applied to a wire supported in front of the open mouth of the pail. Polyethylene powder is then blown into the electrostatic field and then into the pail by means of a flock gun. The excess powder is removed by tapping the inverted pail; and the pail is then baked at 200° C. for 20 minutes to form the interior coating. A smooth coating is obtained which is continuous except around the bottom seam of the pail. A second application is said to close the holes in the coating at the bottom seam.

As the description progresses, it will become apparent that a clear distinction is provided over all of this known prior art.

THE EMBODIMENT OF FIGURE 1

In this embodiment of the invention, cold and hard powdered thermoplastic material is fed by gravity around a negative electrode so that each particle becomes negatively charged. Then, the so charged powder drops through the finish portion of a mold cavity formed by two abutting female mold halves. The mold is grounded and thus an electrostatic potential is established between the powder and the grounded mold. The powder is attracted into adhering contacting relationship with the inside of the mold.

More specifically, referring to FIGURE 1, it will be noted that the mold is designated by the reference numeral 20. The mold 20 comprises two mold halves 22. These are abutted at a parting line 24 and thus form a unitary mold cavity 30 when held in such abutted position by suitable means, not shown.

In this embodiment of the invention, the walls 26 of the mold halves 22 are of substantial thickness and are suitably formed of metal, such as cast iron or the like. Into the walls 26 there are cast, drilled or otherwise formed, ducts 28. Through these ducts 28 are alternately circulated hot and then cold heat-exchange media to provide a heating cycle for the mold in order to fuse into a unitary mass the particulate coating applied to the mold.

The external configuration of the mold 20 can take a variety of shapes and appropriate holding apparatus is used to position and hold the two halves in operable relationship relative to one another.

The internal or female cavity 30 within the mold 20 takes the form of the exterior configuration of the part to be produced therein. The specific part here contemplated is that of a bottle having an enlarged body portion and a narrow neck or finish. The enlarged body portion is made in cavity 30. This cavity is characterized by a bottom wall 34 and the upstanding side walls 26. At the upper extremities of the side walls 26, a tapering shoulder area 38 converges inwardly and upwardly to the restricted finish zone 32. The exposed surface of the finish zone 32 is characterized by a thread element 40 whereby an external thread is formed on the container, in order for the container to receive a screw cap closure. This is exemplary only, and other closure configurations are within the scope of the invention.

Extending down the center in spaced relationship into the mold cavity 30, through the finish zone 32, is a rod-like cathode member 42. The cathode 42, of course, is employed to impart a negative charge to the thermoplastic particles as they fall by gravity into the cavity 30 of the mold 20.

One suitable apparatus by which the thermoplastic particles can be fed into the mold comprises a screw conveyor 50. This is merely exemplary of the invention, and it is to be understood that other analogous gravity feeding equipment can be utilized in the system.

As shown, the screw conveyor 50 comprises a housing 44, that at the top takes the form of a hopper 46. Thermoplastic particles are suitably dumped into the hopper 46 to provide a supply mass 56. The hopper 46 has a bottom throat 48 that opens downwardly to the auger blade 52. The auger blade 52 turns within an elongated conduit 54. In operation, powder particles are moved from the mass 56 down through throat 48 and to the right in the arrow direction 58 by the auger blade 52.

The particles are discharged into a funnel-shaped guide 60 that is positioned in coaxial relationship around the cathode 42. An annular gap is maintained between cathode 42 and guide 60, and the falling particles pass through this annular gap.

As the particles drop through the guide 60, they enter an electrostatic field developed by a voltage differential between the cathode 42 and the grounded mold 20. An exemplary potential is —30,000 volts at low amperage.

The powder particles are fed at a rate so that they will become separated from one another by bumping around the funnel-shaped guide 60. Dispersion is further facilitated by the fact that all of the particles pick up a common, negative charge and thus become repulsive to one another.

This is effective to produce a uniform, fog-like annular stream of dispersed particles moving downwardly around the cathode 42 and dropping through the finish zone 32 of the mold 20.

The electrostatic potential established between the cathode 42 and the grounded mold 20 causes the particles to be attracted to the interior surfaces of the mold cavity 30, as indicated by the various dotted arrow flow lines 62.

In one suitable method of operation, a measured amount of particulate thermoplastic material is introduced into the mold cavity 30. This is effected by means of a suitable control mechanism which predetermines a number of turns of the auger blade 52. As indicated by the dotted arrows 62, the measured material is dispersed as a coating all over the walls of the mold cavity 30.

Thereafter, a heat-exchange fluid such as hot water, hot air, steam, or the like is passed through the ducts 28 to raise the temperature of mold 20 to a level to fuse the particles into a coherent mass. Thereafter, the hot heat-exchange fluid is displaced by a cold heat-exchange fluid which is effective to reduce the fused mass to a solid coherent form. Thereafter, the mold halves 22 are separated to release the part, which is ejected by suitable means.

The foregoing disclosure illustrates some of the more fundamental principles of the present invention. These may be summarized as follows:

(1) Covering an electrostatically attractive, substantially closed mold cavity with autogenously dispersed, solid, particulate, thermoplastic material to provide a uniform layer over all of the forming surfaces of the mold.

(2) Thereafter, heat is supplied to fuse the particles into a coherent mass, followed by cooling, to solidify the mass into a unitary part or container.

(3) The mold halves are then separated and the container is removed.

A clear distinction over the prior art wherein permanent coatings are produced is clearly evident from the foregoing, in that a substantially closed mold cavity is used, and in that a removable part is produced.

FURTHER REFINEMENTS OF THE INVENTION

While the foregoing description has covered some of the more important principles of the invention, it has not embraced all of the refinements. Thus, sharp corners have a propensity to build up heavier charges than do smooth radii and planar surfaces.

In the embodiment of FIGURE 1, there is a tendency for greater particle pick-up in the finish zone 32, as all of the particles must pass therethrough to enter the remainder of the mold cavity 30. This is actually advantageous to a degree, because the finish must accept a screw-on closure. Thus, it is desired that the finish be a little thicker and more substantial than the remainder of the container.

However, to avoid an undue edge build-up at the very entrance where the thread 40 terminates along the top flat surface 64 of the mold 20, the finish zone 32 can be flared. This can be effected by the provision of an annular radius 66.

This will solve the problem of a ridge build-up and keep the finish of a uniform order of thickness, though greater than the remainder of the wall.

However, this operation requires that the flared lip, produced by the collection of powder on the annular radius member 66, be trimmed by a post-forming operation. This, of course, will add a slight extra cost factor to articles produced by the embodiment of FIGURE 1 and will offset to a degree some of the economic improvements provided by the basic principles of the invention.

Further, in some instances of operation in accordance with the embodiment of FIGURE 1, it may be necessary to invert the mold and tap it in order to remove excess powder. However, if the electrostatic field is of proper design and shape, and if an accurately measured amount of particulate material is introduced into the mold cavity, this procedure will not be necessary.

This leads to a logical extension of the invention wherein the electrostatic field can be tailor made to the profile of the mold for uniform distribution of the particles over the surfaces of the mold cavity.

As the following description will bring out, it is well within the scope of the invention to practice the formation of molded articles with such a degree of precision that only a uniform layer, and no more, is built up on the mold. Thus, there will be no excess involved that must be removed.

Additional refinements will also become apparent.

THE EMBODIMENT OF FIGURE 2

This embodiment of the invention illustrates one mechanism and means whereby the electrostatic field can be tailor made to conform to the interior configuration of a mold cavity for producing a uniform coating of particulate material thereon.

In this embodiment of the invention, the same type of feeder system as shown in FIGURE 1 can be used.

In this embodiment of the invention, a particular configuration of cathode member is employed.

Here, the cathode is designated by the reference numeral 68. The upper portion is essentially in the form of a straight wire 70. This portion will be called the top end or finish portion of the cathode 68. Down inside the shell mold 72 is a loop portion 74. The loop portion 74 has a peripheral profile equivalent to the interior of the mold 72. The loop portion 74 is made on a reduced scale and thus is essentially a diminutive replica of the mold cavity below the finish area 76.

In accordance with this embodiment of the invention, it is to be understood that the electrostatic field developed within the finish zone 76 is reduced or contoured to that zone. Down inside the mold cavity proper, however, there is a larger field to conform to the enlarged volumetric space of the mold cavity.

Therefore, the principle of the present invention is illustrated that the electrostatic field can be tailor made to conform to the interior configuration of the mold.

THE SHELL MOLD

An important feature of the invention as regards high production with minimum investment is also illustrated by the embodiment of FIGURE 2. Thus, the mold 72 is of the thin shell variety. Each half 78 has a thin wall 80. The wall 80 can be made of any heat conductive material, and of course is of electrically conductive material. Electrical conductivity provides a positive medium for grounding the mold to provide electrostatic attraction force. Within the broad scope of invention, this can be made of metal, or siliceous material, including glass. The siliceous molds will have metallic coatings thereon for conductivity.

In accordance with this aspect of the invention, heat can be applied by radiation sources, such as infrared heaters, directed toward the exterior of the mold. The heat is readily conducted through the thin shell walls to fuse the powdered materials deposited on the mold interior into an integral piece.

It is also within the scope of the invention to heat the shell molds very rapidly by high frequency induction energy. Also, by the use of high frequency induction energy, the plastic itself and not the mold, can be heated by choosing an appropriate frequency. By so operating, only the plastic material will respond to the frequency used, and the mold will not. Polyvinylchloride is one example of a plastic that can be softened in this manner.

It will be noted that in this mold, a sharp edge exists at the finish zone 76 of mold 72. However, since the electrostatic field is tailor-made to conform in shape to the interior profile of the mold, there will not be an excess build-up of particles within the finish zone, this being dictated by the reduced intensity of the electrostatic field in that zone of the mold. Therefore, as distinguished from FIGURE 1, the part will come out of the mold in ready-to-use condition without the necessity of having to trim the finish in any way.

By using a large number of shell molds of the type shown in FIGURE 2, an efficient production operation can be provided. Thus, the plural molds can be coated interiorly with powder. Subsequently, they can be run through a heating zone such as radiants mentioned above, or through a convection furnace where both the molds and the particles attached to the interior are brought up to fusion temperature for the particles. Then, the molds are cooled by suitable means, such as an air quench. This solidifies the parts. Subsequently, the molds are split and the parts removed. A mold recycle, of course, will be required in this type of operation, and this will be brought out in a subsequent portion of this disclosure, directed to the method of invention.

As heating and cooling media, salt baths are also to be considered within the scope of the invention.

THE EMBODIMENT OF FIGURE 3

A further and logical extension of the invention as regards conforming the electrostatic field to the interior configuration of the mold is shown in FIGURE 3.

In this embodiment, the cathode is of the same external profile throughout its length. Thus, the cathode 82 can take the form of a rod or tube of uniform outside diameter. However, in accordance with this embodiment, a portion of the field generated by the cathode 82 is shielded to reduced intensity. This will produce the same effect as produced by the slim upper portion 70 of the cathode 68 of FIGURE 2.

The shielding is suitably affected by encircling that portion of the cathode 82 that passes through the finish zone 84 of the mold 86. One suitable shield, as shown in FIGURE 3, comprises a dielectric layer 88 supporting a foil shield 87, the latter being grounded to carry off an appropriate portion of the charge to produce a field of desired lower intensity. Also, conductive grids can be used in place of the foil 87 shown.

By so operating, an electrostatic field of diminished intensity is produced within the finish zone 84. The remainder of the cathode 82 is freely exposed and thus produces an expanded field, conforming to the enlarged mold cavity 30.

It will be noted that the mold 86 comprises two mold halves 90. These halves have a wall structure similar to that shown in FIGURE 1, with optional heating ducts as therein described. The line at which the mold halves abut one another is represented by the parting line 24.

The same kind of gravity feed mechanism for introducing cold particulate thermoplastic resin into the mold cavity is shown as has been described relative to FIGURE 1. This feed unit is here designated as the screw conveyor 50. The particulate material is moved in the arrow direction 58, and discharged into the funnel-shaped guide 60 where the individual particles pick up a common negative charge from the cathode 82. In this manner they are rendered autogenously repulsive and fall as a gas dispersion down around the shielded cathode 82, 88 and into the mold cavity 30.

By this embodiment of the invention, the particles are uniformly distributed over the inside of the mold. Within the extended scope of the invention, it will be understood that the shield 88 functions to provide an appropriate intensity of attraction in the finish zone 84 so that a very slightly greater build-up of particulate material is provided there than in the rest of the mold. Thus, the finish will be made of slightly greater thickness to better support a screw-on closure, with a lesser wall thickness being used in the remainder of the container, for greatest economy of raw material utilization.

The prior description has described the shield element 88 as a cylindrical element of uniform diameter. Within the extended scope of the invention, however, this can be contoured. Thus, if desired for further adaptability in tailor-making the electrostatic field in the finish zone 84, the shield 88 may have a wall thickness of varying dimension from end-to-end. The wall may taper or may vary from a smaller lower end to a heavier intermediate portion and then back to a smaller section at the top.

By so operating, it will be possible to provide an exact amount of particle build-up at the sharp edge 94. This will avoid any necessity for a post trimming operation, yet at the same time will make the entrance end of the finish slightly thicker in order to properly support a screw-type closure.

It will be understood that in accordance with this embodiment of the invention, better and greater flexibility of control, depending upon the configuration of the shield 88, can be provided for tailor-making substantially any thicknenss of container wall desired. In this regard, it is to be pointed out that the bottom of the formed article can be made thicker than the side wall if this for some reason should be desired. Thus, cathode spacing from the bottom of the mold cavity can be used as a thickness control factor.

SUMMARY OF THE EMBODIMENTS OF FIGURES 2 AND 3

As a summation of the subject matter encompassed by FIGURES 2 and 3, it will be understood that the electrostatic field can be custom built by:

(A) Developing a proper electrode geometry; or (B) Shielding part of the electrode to reduce the intensity of the electrostatic field in certain zones within the mold cavity; or (C) An inversion of B, that is, by shielding a part of the mold, as in the finish area. This could be effected by applying a shielding coating, such as heat-resistant material, namely nylon, Teflon,[1] or the like, to localized areas of the mold to reduce the intensity of the electrostatic field at the chosen area or areas.

The effect will be that the electrostatic field is so shaped as to produce not only a uniform collection of particles for desired wall thickness build up, but a versatility of variation in wall thickness build up if desired from one zone to another of the mold.

In the foregoing discussion, it is to be understood that the strength of the field is reduced by shielding means, and this may take the form of a wire grid member per se, or such a grid member embedded within a dielectric matrix such as nylon or Teflon. It will be evident to those skilled in the art that a number of different media can be used within the scope of the invention to provide the desired shielding in accordance with the broad principles set down herein.

THE FOURTH EMBODIMENT; GAS-ELECTROSTATIC DISPERSION

In the preceding embodiments of the invention, the mold is filled by using gravity to pull the heat-softenable particulate material down into the mold. It is also possible, however, to load the mold, using a gas as a carrying medium, to positively direct particles into the mold cavity.

It is also possible that a flowing gas stream can be used to purge from the mold any excess particles that are placed therein. In fact, by operating with an excess amount of particulate material, a visual signal is provided when the excess particles are expelled, showing that the mold is properly filled and that the introduction of particles can be discontinued. This provides an introduction ---
[1] Trademark for a plastic of tetrafluoroethylene polymer.

to the fourth embodiment of the invention, wherein the foregoing features are present.

In this embodiment of the invention, a tubular cathode is used to introduce a gas-carried stream of heat-softenable particles into the mold cavity. As the particles move through the cathode, a negative charge is imparted for autogenous repellency. Dispersion of the particles is thus enhanced since the autogenous repellency supplements the dispersion provided by the carrying gas.

To more specifically describe this embodiment of the invention, reference is made to FIGURE 4 of the drawings. As there shown, a mold 86 is used, comprising two halves 90 that abut at a parting line 24. The mold halves include walls 96, having ducts 28 through which heat-exchange media can be cycled, to first fuse, and then cool the particulate material deposited within the mold cavity 30, to produce the part.

In this embodiment of the invention, the cathode is designated 98, and is of tubular shape. It is utilized to carry a gas-dispersed stream of particulate material from a suitable supply source. If desired, a venturi pick up unit, or the like, can be utilized at some place in the line (not shown), to aspirate heat-softenable particulate material from a supply, and then direct it into the mold cavity 30 by way of the tubular cathode 98. It will be noted that the lower end of cathode 98 is spaced away from, and thus out of contact with, the mold 86. This serves a dual function:

(1) It keeps the cathode 98 from being grounded by contacting the mold 86; and (2) It provides an annular passageway at the finish zone 84, so that the excess particulate material will have an escape route out of the mold cavity 30.

It will be noted that the bottom end of the cathode-injection tube 98 is inserted into the mold a selected, but substantial, distance. This provides assurance that the particulate material will be introduced well into the mold cavity 30, and not be caught in the exhaust flow of gas that passes up around the cathode 98 at the finish zone 84, as indicated by the arrows 100. Thus, the carrier gas stream is released well down in the mold cavity and the particles are uniformly distributed and dispersed around the walls, and then are attracted into uniform layer form over the interior of the mold.

It will be understood that a certain latitude is encompassed by the invention relative to the distance through which the lower end of the tubular cathode 98 is extended into the mold cavity 30. In FIGURE 4, the bracket 102 designates a variable distance of introduction. The actual distance of insertion within the limits indicated, will in any specific instance, depend upon the shape of the mold cavity 30, the size of the particles being used, and other factors.

As the particles pass down through the cathode 98, they become negatively charged. This renders them repellent to one another. As they emerge from the cathode, they are dispersed by the expanding carrier gas stream as it fills out within the mold cavity, and by the autogenous repellency factor.

An advantage of this system is that the particles "look" for openings in the deposited layer and fill any openings to produce a uniform build-up on the mold wall. When the coating builds to the thickness dictated by the electrostatic attractive potential present, the particles will no longer find any bare or thin spots and will no longer adhere to the mold wall.

When this condition develops, the gas exhausting from the finish of the mold will carry out the excess particles. Thus, the operator or a sensing mechanism will be signalled to stop the powder loading operation. By continuing the gas flow, the excess particles will be explained.

It will be noted that a condition exists at the finish zone 84 that it analogous to that of FIGURE 3. Thus, a sharp edge 94 exists at the upper corner of the finish zone 84, at the intersection with the flat walls 96. Excess particle build-up can be controlled here, in accordance with the principles laid down in FIGURE 3, as by utilizing a shield to reduce the intensity of the electrostatic field at this point. Alternately, an annular radius 66 can be utilized, as in FIGURE 1. With proper control, there will be provided a controlled build-up in the finish zone 84; and the build-up can be adjusted to make the finish slightly stronger in order to accept a screw-on type closure.

When operating in accordance with this embodiment of the invention, the following steps are apparent:

(1) Blow a dispersion in gas, of heat-softenable, particulate material through the charged cathode 98, and into the mold cavity 30. It will be noted that when the surfaces of the mold cavity become covered with a uniform layer of the particles, the walls no longer attract the particles. Thereafter, excess particles will be expelled from the mold, as indicated by arrows 100.

(2) Cut off the introduction of particulate material, but continue the flow of carrier gas until all excess particulate material is removed from the mold cavity. It should be kept in mind that this operation contemplates a delicate gas flow so that there is not a sufficient amount of force generated to dislodge the particles, once deposited on the wall surfaces.

(3) Shut off the flow of gas, when excess particulate material has been removed, as evidenced by no further efflux of particles from the finish zone 84. At this point, the mold is properly coated and the excess particles have been removed.

(4) Circulate a hot heat-exchange medium through the mold to fuse the particles into a unitary piece.

(5) Circulate a cold heat-exchange fluid through the mold passages to cool and harden the part to a handleable condition.

(6) Split the mold and remove the part.

Thereafter, the process cycle is suitably repeated.

Of course, in this embodiment of the invention, as in FIGURES 2 and 3, there is no waste and excess particles are recycled through the process until completely used up.

THE INVENTED EMBODIMENT

As shown in FIGURE 5, there is an embodiment of the invention otherwise identical to that shown in FIGURE 4, except for the fact that the mold has been inverted. This automatically takes care of excess particle removal. After all surfaces of the mold have been appropriately covered, in accordance with the intensity of the electrostatic field, the excess particles fall out of the mold.

This embodiment is illustrated in the event of a particular situation in which one or the other of the embodiments of FIGURES 4 and 5 may be most appropriately used.

It will be noted that the embodiments of FIGURES 4 and 5 as well as the embodiments of FIGURES 2 and 3 provide an advantage of operation in that (1) either there is no excess because of the contouring of the electrostatic field, making possible the use of an exactly measured amount of material to be added to the mold; or (2) by the automatic removal of any excess.

From the foregoing, it will be evident that a number of refinements upon the invention are being provided.

Figure 6:
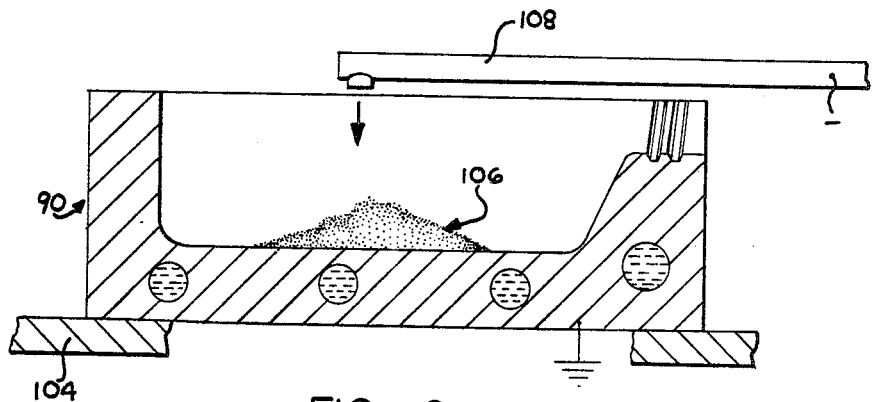
FIGURE 6 is a longitudinal sectional view of a fifth embodiment of apparatus for practicing the invention, and further illustrating a first step in a method of invention.
Figure 7:
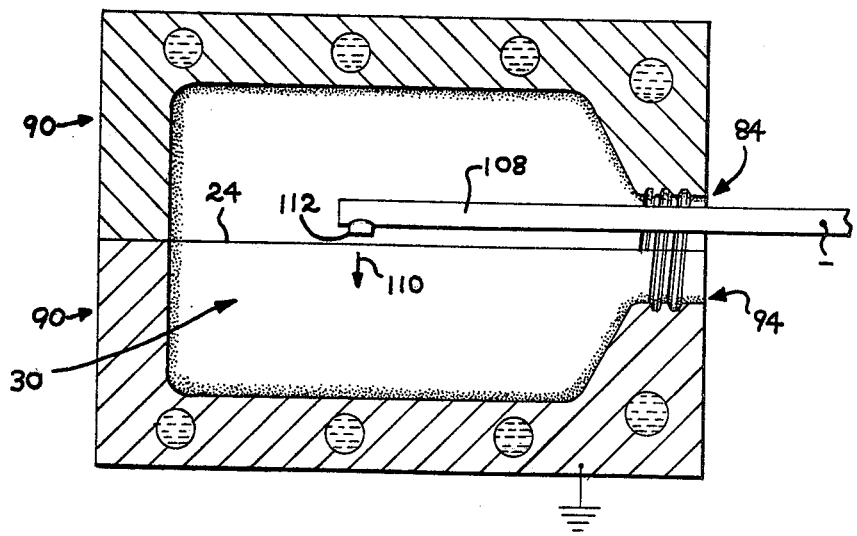
FIGURE 7 is a view similar to FIGURE 6, but illustrating the remaining apparatus component and subsequent steps in this method.

THE GAS DISPERSION EMBODIMENT OF FIGURES 6 AND 7; PLACING A MEASURED MASS OF PARTICULATE MATERIAL IN A MOLD

It is to be understood that in a high speed production operation a desirable situation, of course, would be to put in an exact amount of material so that no excess would have to be contended with in a recycle operation.

Therefore, it is within the scope of the invention to put into the mold a mass of discrete particles of heat-softenable material in an exact amount. This is done by placing in one of the mold halves a measured mass of powder as the mold half travels along a production line. This is done before the mold halves are placed in abutting, operable relationship to one another to produce the enclosed mold cavity.

By referring to FIGURES 6 and 7, it will be observed that a mold half 90 is placed on a grounded surface 104 in horizontal position. In this position, the mold half 90 opens upwardly as a cup-like container. By this orientation, the mold half 90 can be moved horizontally along the production line and pass beneath a suitable filling spout to receive a precisely measured mass 106 of heat-softenable particles. It is to be understood that the mold half 90 will be moved along the production line in appropriate steps. Thus, the mold will move to the filling station and pause while a measured amount of material 106 is placed therein.

Thereafter, the mold will be advanced to a station where an upper mold half is applied. This is shown in FIGURE 6.

It will be noted that a cathode 108 is positioned just above the mold half 90 in FIGURE 6. This cathode is utilized to inject a stream or puff of gas into the mold cavity after the upper mold half has been applied as shown in FIGURE 7.

With the cathode 108 positioned high enough to clear the top of the mold half 90 in FIGURE 6, the mold half can move beneath the cathode and stop. As shown in FIGURE 7, the upper mold half 90 is then applied. It will be noted that the cathode 108 is negatively charged. With the situation of FIGURE 7 existing, an electrostatic field will be developed within the mold cavity 30.

Thereafter, air or other suitable gas is introduced through the cathode 108. The gas proceeds downwardly in the arrow direction 110 to disperse the mass 106 previously existing in FIGURE 6, so that the particles can become uniformly attracted to the walls of the mold cavity 30 as a uniform layer. It will be understood that the gas issuing downwardly from the outlet 112 of cathode 108 is of controlled velocity to develop a uniform dispersion throughout the mold cavity. The action taking place during this coating phase can be described as follows:

The particles will be picked up by the introduced gas stream and swirled around the cathode 108. They will become similarly charged and thereby will be rendered repellent to one another. In this condition, the particles will be attracted to the walls of the mold and will "find" thin spots as the coating is developing. Thus, a uniform layer will be produced all over the inside of the mold cavity, including the finish zone 84.

Thereafter, the cathode 108 is removed and the mold is heated to fuse the particles into a unitary part. Following the heating, the mold is cooled to solidify the part. Thereafter, the mold halves are split and the part removed.

It will be evident that the principles of electrostatic field contouring also can be applied to this embodiment of the invention. Thus, a shield of the nature of 88 in FIGURE 3 can be placed around the cathode 108 to reduce the intensity of particle pickup in the finish zone 84. By so operating, an exact amount of material will be deposited within the finish zone 84, and there will be no excess edge build up as at the sharp edge 94. Thus, a completely finished part will be ejected from the mold and there will be no post finishing operations of any kind.

As an extension of the invention shown in FIGURES 6 and 7, and to support the broad terminology "placing a mass of particulate, heat-softenable material into a mold," the following is to be considered within the scope of the invention.

The arrangement of FIGURES 6 and 7 has been horizontal. However, the mold halves can travel in a vertical disposition through a production operation. For that matter, the molds can travel through a production system with any directional orientation of the axis of the mold as long as there is a portion of the mold so oriented relative to the pull of gravity, that a weighed mass of particulate material can be placed thereon. Thus, it is within the scope of the invention to set the molds up vertically and place a weighed amount in one half along the bottom, after which the other half is applied to "close" the mold. If desired, both halves of the mold can be placed together to form the mold cavity, after which a weighed amount of material is introduced.

When so operating, the gas dispersion tube is introduced to distribute the particles as will be apparent from the discussion of FIGURES 6 and 7.

The following enumerated steps are apparent from the foregoing description of FIGURES 6 and 7:

(1) Place an exact amount of heat-softened, particulate material into a mold cavity;

(2) Disperse and charge the particles so that they will be attracted to the mold and uniformly cover the same;

(3) Heat the mold to fuse the particulate covering layer into a unitary mass; and (4) Cool the mold to harden the fused mass into a part, and eject the part from the mold.

FURTHER METHOD RAMIFICATIONS

From the previous discussion, it is evident that various method ramifications are apparent within the framework of the present invention.

As briefly discussed above relative to the shell mold embodiment of FIGURE 2, a mass production method can be advantageously provided on an extremely economical basis. Now, in order to fully cover all details of a process utilizing the shell mold of FIGURE 2, reference will be made to FIGURE 8 of the drawings, and a complete description of a molding operation will be set forth.

THE SHELL MOLD PROCESS OF FIGURE 2

*Step 1.*—Provide a mold that is electrostatically attractive to non-conductive, heat-softenable particles.

In FIGURE 8 of the drawings, a continuous belt conveyor 114 is exemplified. This is lapped over spaced carrying rolls 116. Means is provided, though not shown, for driving at least one of the rolls 116, in order to propel conveyor 114 in the arrow direction 118. By this arrangement, an incrementally movable platform is provided, upon which molds can be placed and then passed through the various subsequent steps of the process.

In this first step of the process, two mating mold halves 78 are placed in matched, abutting relationship to form a shell mold 72. Mold halves 78 can be made of electrically-conductive materials, including metals, and metal-coated siliceous substances.

The conveyor 114, or a suitable plate member carried thereby, is grounded at this point in the operation to render the mold 72 electrostatically attractive for non-conductive, heat-softenable particulate materials to be placed into the mold.

Arrow 120 represents a loading nozzle, exemplified as a cathode according to the embodiment of FIGURE 2. Those of the other embodiments may also be used.

At the station of Step 1, the mold 72 is loaded with a given amount of particulate material. This is conformed by the mold as a layer to the exact shape of the article to be produced. The loading is effected by dispersing the particles with a common, negative electrical charge; and the particles are suitably fed by gravity.

If desired, and using the principles previously set forth, the electrostatic field can be contoured to the shape of the mold cavity for the production of a uniform layer of the particulate material on the surfaces of the mold cavity.

Thus, the particles are charged so that they become autogenously repellent. They are then passed into sufficiently close proximity to the mold surfaces so that they become electrostatically held thereto. The non-conductive nature of the particles prevents their charge, which is opposite to that of the mold, from being bled off. Accordingly, the particles remain in electrostatically held relationship to the mold surfaces.

In this step of the process of the present invention, a uniform layer of particles is built up on the mold surfaces, even though the mold may be of irregular and complex shape. The layers are uniform in thickness, free of holes, and do not depend upon any wetting action for their formation.

Particles leaving the negative charging zone are attracted to the electrically grounded mold in front of them. The negatively charged particles "see" the oppositely charged mold surfaces. Thus, they are attracted and held to the mold surfaces.

The layer continues to build up until it is thick enough to produce a dielectric barrier, through which the particles can no longer "see" the grounded mold surfaces. However, any thin spots in the layer provide places where the particles can "see" through to ground. The particles are further attracted to these points, and the thin spots are filled up. This explains why the layers are uniform in thickness and free of pin holes.

Thus, according to the present invention, rejects from defective parts, caused by wall porosity, will be substantially eliminated.

Particulate materials that can be used in the practice of the present invention include the following: polyvinylchloride, polyethylene, polystyrene, polypropylene, Teflon (trademark for a plastic containing tetrafluoroethylene polymer), cellulosics, thermosets such as dry epoxies, vitreous frits, and others.

Once the covering layer is properly established, excess particulate material is removed, as by gentle vibration or a sweep gas, and the next step of the process is effected. Accordingly, the conveyor 114 is next incrementally advanced to move the mold to the station of Step 2.

*Step 2.*—Heat the mold to fuse the covering layer into a coherent mass.

At the station of Step 2 of the process, heat energy is directed against the loaded mold to raise the temperature of the particles forming the covering layer to their fusion level. This is effective to fuse the particles into an integral mass.

In this heat-application step of the invention, it is to be understood that salt baths or other heat-applying media can be used with facility. The invention is not to be limited in this regard.

Once the particles of the covering layer are properly fused together, the conveyor 114 is again incrementally advanced to move the mold 72 to the station of Step 3.

*Step 3.*—Part cooling. In this step of the invention, the part is cooled and removed from the mold.

Here, an air quench, such as applied by a fan 124 of FIGURE 8, can be utilized to reduce the temperature of the mold. This is effective to reduce the temperature of the fused mass carried by the mold, of course, so that it is reduced to an immobile state or solidified condition.

With a salt bath technique, the mold would be subjected to an appropriately cold bath to effect the desired degree of cooling of the fused mass.

Once the mass is properly cooled, the conveyor 114 is incrementally advanced to move the mold 72 forward to the station of Step 4.

*Step 4.*—With the part cooled to a handleable condition, the mold is split and the part is removed. In this step of the process, the part is separated from the mold halves and diverted to a packaging operation, designated by the number IV-A in FIGURE 8.

*Step 5.*—Following the part removal step, the mold halves are recycled as indicated by the box designated V in FIGURE 8 to the station of Step 1. At Step 1, the mold halves are reassembled and again loaded with a given mass of material so that the production cycle can be repeated.

BROAD ASPECTS OF THE PROCESS

If it be visualized that, for example, several thousand molds are utilized on a wide conveyor in the process shown in FIGURE 8, a very high volume production operation becomes apparent.

The total cycle time in a cold-hot-cold salt bath operation, including mold loading, is on the order of only a few seconds with a shell mold. The economics become readily apparent when it is visualized therefore that parts can be produced at the rate of one or more per minute from a single set of inexpensive molds.

THE HOT COATING TECHNIQUE

In the prior description, all mold loading and coating operations have been conducted with dry and hard particulate, though heat-softenable materials. Within the broad scope of the invention, it is also possible to coat a cool mold with particles that are in softened condition. In the procedures relating to the use of hardened particles, a mold cycle from cold-to-hot-to-cold was necessarily involved. In the hot particle operation, mold cycling is alleviated.

In FIGURES 9 and 10, there is illustrated an apparatus and process for producing "molded" articles using particles heated to a softened state before they are introduced into the mold.

The mold is generally similar to that shown in FIGURE 3 and is accordingly designated by the reference numeral 86. The two halves 90 are provided with ducts 28 through which a cool heat-exchange medium is circulated in order to dissipate heat absorbed by the mold from the heated particles during the molding operation.

In this embodiment of the invention, the cathode 126 is a hollow tube. Through this tube, a stream of hot gas, such as hot air, is moved. This provides a carrier for the particles. It is to be understood, of course, that the air or gas is of a temperature sufficient to heat the particles to the softening point and it is in this softened condition that they are injected through the tube and into the mold cavity 30. Cathode 126 imparts an autogenous dispersion charge to the particles. The mold is grounded and thus a force is established whereby the particles are attracted onto the mold surfaces.

The cathode can be moved into and out of the mold in the arrow direction 128 during the spraying operation. This facilitates the application of a uniform layer on the interior of the mold cavity 30.

If desired, certain portions of the electrode can be shielded in accordance with the principles developed in the earlier part of this description. By so operating, the electrostatic field can be made to conform to the interior configuration of the mold cavity.

By the principles of this invention, a precisely measured amount of particulate material can be introduced into the mold to produce a layer of controlled thickness without excess or wastage or post forming operations.

In FIGURE 10 of the drawings, the steps involved in this aspect of the invention are set forth in box form. These include the following:

(1) Hot spray a heat-softened particulate material into a cold mold cavity and electrostatically attract the particles as a uniform coating over the forming surfaces of the mold cavity.

(2) Split the mold and remove the cooled and integrated parts.

(3) Recycle to the beginning of the operation.

This operation is adapted to extremely high speed production. Actually, an analogy to injection molding is provided, as to introduction of softened material into a cool mold cavity. Further, this and the prior embodiments of the invention show how the versatility of application can be broadly extended within the scope of the invention.

PRODUCTS MADE BY THE PRESENT INVENTION

FIGURE 11 illustrates a bottle 130 of the type that can be produced by the present invention. The design configuration 132 along the surface is produced by depressions in the mold surfaces. An external screw thread 134 is provided at the top of the bottle 130. This accepts a screw-type closure. Other closure media can, of course, be applied in accordance with known principles of the art.

Since a female mold cavity is used, analogous to that of a blow-molding operation, it will be apparent that an equivalent array of products can be produced, as by the prior art blow-molding process.

GENERAL COMMENTS

The drawings illustrate the use of screw feeders in FIGURES 1 and 3 for moving the plastic particles into the mold. These showings are to be understood as being exemplary only. Vibrator-type feeders also can be used. Others will become apparent to those skilled in the art.

Although the foregoing description may appear to place relative emphasis on thermoplastic materials of organic origin, to wit, synthetic resins, the invention is not to be considered as limited to these thermoplastic materials alone. Actually, for the first time, the present invention makes it possible to fabricate molded objects from thermosetting resins and also some thermoplastic resins that could not be previously processed, because of extremely high viscosity, high shear strength, or other. Certain materials, particularly the thermosets, have such poor flow characteristics that they cannot be processed by plasticizing machines such as screw extruders. Thus, the present invention provides a very substantial advance to the art by the fact that there is no dependence on flow of softened material for forming.

Thus, in accordance with the present invention, thermosetting resins can be employed, because the function of the heat cycle is merely to cure or set the plastic; the only flow is the fusing of the particles to one another.

The present invention may be explained in terms of plasticizing as regards the processing of thermosetting plastics or similarly difficult to process materials. In conventional blow molding operations, plasticizing is necessary and is usually done on an extruder, such as the screw-type previously mentioned, or the screwless-type, or on piston machines. In the present invention, there is a plasticizing, but only by the heating to fuse the particles together, and not by the high compression forcing of the particles in a flowable state through a forming orifice. Thus, very high viscosity materials can be processed in accordance with the present invention because the plastics are never subjected to a high rate of shear.

IMPROVED SURFACE FINISH

In accordance with the present invention, this may be effected by injecting pressurized gas into the container through the finish while the plastic is in molten condition. This will force the fused mass into intimate contact against the walls of the mold and thereby provide a finish as fine as the surface finish of the mold. The function of the gas pressure is not one of blowing the article, but instead it is one of coalescing the particles into more intimate relationship with one another and thereby producing a high finish on the outside surface. At this point, it should be noted that a distinction is provided relative to the art cited herein. Thus, in the coating of articles such as the pail or bathtub previously mentioned, the article itself serves as the mold. Thus, the exposed surface of the coating is not in contact with a mold surface and therefore it is impossible to produce this type of finish in accordance with the teachings of the art discussed.

This pressurized gas aspect also provides a distinction from the blow molding art where a cold mold is used. Thus, the plastic is frozen under such conditions and does not flow over the mold surface as contemplated herein, where the mold is heated to fuse the particles and under such conditions, the pressure is applied to provide intimate contact between the exterior surface of the article and the mold.

The prior description has related to the coating of a cold mold with both hard and soft particles. There has been no description of the coating of a hot mold with hard particles so that they would become fused immediately on contact with the mold. This can be done, and is also to be encompassed within the scope of operation of the invention.

What is claimed is:

1. In apparatus for producing molded articles from non-conductive, heat-softenable, particulate materials,
   mold means defining a hollow cavity having mold surfaces the cavity having a restricted, mouth-like opening,
   a source of electrostatic potential,
   means grounding said mold means to said source of electrostatic potential,
   an elongated cathode extended through said opening and into said mold cavity and being out of contact with said mold means,
   said cathode comprising a restricted portion extended through said mold opening, and an enlarged portion within said mold cavity, said restricted portion being adapted to develop a lesser intensity electrostatic field within said mold opening and said enlarged portion being adapted to develop a greater intensity electrostatic field within said mold cavity,
   and means for feeding heat-softenable, particulate material through said opening while the cathode is positioned therein whereby said particles become negatively charged and attracted to said surfaces of said mold cavity as a substantially continuous layer of controlled thickness within said cavity and said opening,
   and means for heating said mold to reduce said particulate layer to an integral, fused mass.

2. In apparatus for producing molded articles from non-conductive, heat-softenable, particulate materials,
   mold means defining a hollow cavity having mold surfaces and a restricted, mouth-like opening,
   a source of electrostatic potential,
   means grounding said mold means to said source of electrostatic potential,
   an elongated cathode extended through said opening and into said mold cavity and being out of contact with said mold means,
   said cathode being contoured to develop a shaped electrostatic field within said mold cavity with a potential of lesser intensity within said mouth-like opening and a potential of greater intensity within said cavity,
   and means for feeding heat-softenable, particulate material into said cavity through said mouth-like opening while the cathode is positioned therein,
   whereby said particles become negatively charged and attracted to said surfaces of said cavity as a layer of controlled thickness within said cavity and said opening,
   and means for heating said mold to reduce said particulate layer to an integral, fused mass.

3. In apparatus for producing molded articles from non-conductive, heat-softenable, particulate materials,
   mold means defining a hollow cavity having mold surfaces and a restricted, mouth-like opening,
   a source of electrostatic potential,
   means grounding said mold means to one side of said source of electrostatic potential,
   an elongated, cylindrical cathode having a first portion extended through said opening and defining a passage through said mold opening, and a second portion extended on into said mold cavity, and both said portions being out of contact with said mold means,
   electrostatic shield means positioned in surrounding relation to said first portion of said cathode and spaced from said mold surfaces, and means for feeding heat-softenable, particulate material through said opening around said cathode and into said mold cavity, whereby said particles become negatively charged and attracted to said surfaces of said mold cavity as a substantially continuous layer of controlled thickness within said cavity and said opening, with the layer completely covering the surfaces of said cavity, and means for heating said mold to reduce said particulate layer to an integral, fused mass.

4. In a method of producing molded articles from non-conductive, heat-softenable, particulate materials, the steps of providing a shaped mold surface having a contour, establishing a shaped electrostatic field, conformed to the contour of said shaped mold surface, moving heat-softenable, particulate material into said shaped electrostatic field whereby the particles become negatively charged and attracted into contact with said mold surface as a substantially continuous layer covering said surface, and heating said layer to convert said particulate material into a fused mass.

5. In a method of producing molded articles from non-conductive, heat-softenable, particulate materials, the steps of providing a mold having a contoured mold surface, establishing a shaped electrostatic field conformed to the contour of said mold surface, moving heat-softenable, particulate material into said electrostatic field whereby the particles become negatively charged and attracted into contact with said mold surface as a substantially continuous layer covering said surface, heating said layer to convert said particulate material into a fused mass, cooling said mass to reduce it to handleable condition, and then removing the cooled mass from said mold surface as a molded article.

6. In a system for producing shaped articles from non-conductive, heat-softenable, particulate materials, conveyor means, means for moving said conveyor means, mold means defining a hollow cavity having mold surfaces, said cavity being closed except for a restricted, mouth-like opening, means for positioning said mold means on said conveyor for movement along by said conveyor from one station to another, mold loading means located relative to said conveyor to load heat-softenable, particulate material through said mouth-like opening and into said mold cavity at a first station, a source of electrostatic potential, means connecting said mold means to one side of said source of electrostatic potential, means connecting said mold loading means to the other side of said source of electrostatic potential whereby particles loaded into said mold cavity are electrostatically charged and attracted to said mold surfaces as a substantially continuous layer covering said surfaces, means located relative to said conveyor means at a second station to heat a charged mold to a temperature sufficient to fuse a layer of heat-softenable, particulate material covering said mold surfaces into an integral mass, and means located relative to said conveyor means at a third station to cool said mold means to reduce a fused integral mass to handleable condition as a molded part.

References Cited

UNITED STATES PATENTS 3,377,183  4/1968  Hurt et al. _____ 117—17

DONALD J. ARNOLD, Primary Examiner

U.S. Cl. X.R.

18—5; 264—26, 27, 309